United States Patent [19]

Mobley et al.

[11] Patent Number: 5,708,963
[45] Date of Patent: Jan. 13, 1998

[54] METHOD AND APPARATUS FOR USING SATELLITES FOR REVERSE PATH COMMUNICATION IN DIRECT-TO-HOME SUBSCRIPTION INFORMATION SYSTEMS

[75] Inventors: J. Graham Mobley, Dunwoody; Macy W. Summers, Norcross, both of Ga.

[73] Assignee: Scientific-Atlanta, Inc., Norcross, Ga.

[21] Appl. No.: 390,461

[22] Filed: Feb. 24, 1995

[51] Int. Cl.$^6$ .............................. H04B 7/185; H04B 7/19; H04B 7/195

[52] U.S. Cl. ............................ 455/12.1; 455/3.2; 455/4.1; 455/5.1

[58] Field of Search .......................... 455/3.2, 5.1, 4.1, 455/4.2, 12.1, 73, 74, 129, 131, 13.2; 340/825.08, 825.54; 348/6, 12, 13; 343/725, 727

[56] References Cited

U.S. PATENT DOCUMENTS

| | | | |
|---|---|---|---|
| 4,860,352 | 8/1989 | Laurance et al. | 455/12.1 |
| 4,945,410 | 7/1990 | Walling | 358/141 |
| 4,994,908 | 2/1991 | Kuban et al. | |
| 5,036,389 | 7/1991 | Morales | 358/84 |
| 5,101,267 | 3/1992 | Morales-Garza | 358/84 |
| 5,151,782 | 9/1992 | Ferraro | 358/86 |
| 5,177,604 | 1/1993 | Martinez | 358/86 |
| 5,223,923 | 6/1993 | Morales-Garza | 358/84 |
| 5,257,099 | 10/1993 | Morales-Garza | 358/84 |
| 5,291,554 | 3/1994 | Morales | 380/5 |
| 5,329,590 | 7/1994 | Pond | 380/20 |
| 5,357,276 | 10/1994 | Banker et al. | 348/7 |
| 5,367,330 | 11/1994 | Haave et al. | 348/7 |
| 5,369,779 | 11/1994 | Moreland | 455/5.1 |
| 5,412,416 | 5/1995 | Nemirofsky | 455/12.1 |
| 5,483,663 | 1/1996 | Tawil | 455/3.2 |

*Primary Examiner*—Chi H. Pham
*Assistant Examiner*—Gertrude Arthur
*Attorney, Agent, or Firm*—Banner & Witcoff, Ltd.

[57] ABSTRACT

Apparatus for using a low earth orbit satellite for reverse path communication in a subscription information service delivery system comprises a receiver adapted to receive a subscription information service signal at frequencies exceeding 1 GHz via a first path. Responsive to a poll, the receiver is adapted to transmit a response signal to the poll at frequencies under 1 GHz via a second path to a low earth orbit satellite. The polling request may be transmitted with the subscription information service signal or through the low earth orbit satellite. Preferably, the polling request is addressed and comprises a response message length field. The response comprises a service provider identifier and a subscriber identifier and further, preferably comprises response data encrypted by a key known to the service provider.

43 Claims, 10 Drawing Sheets

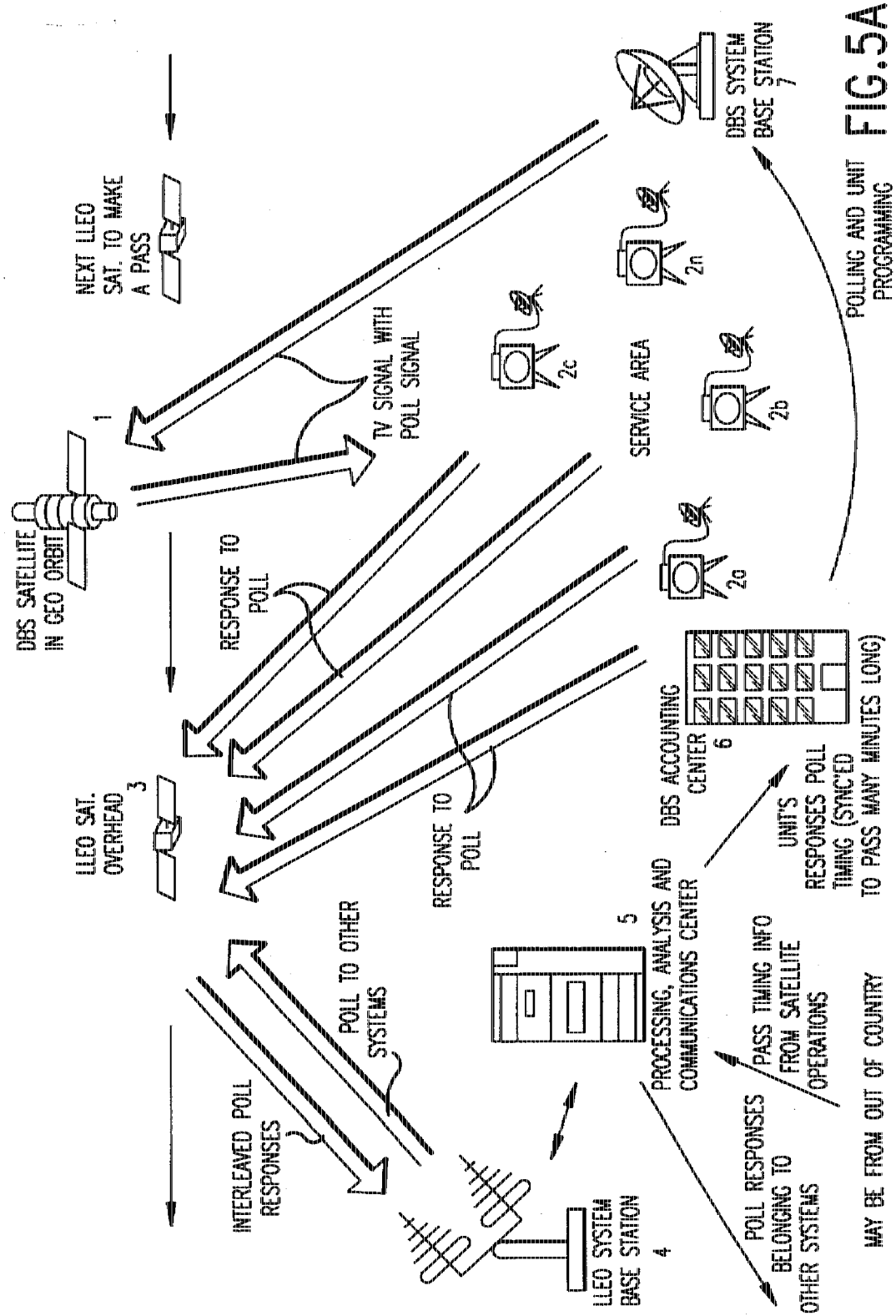

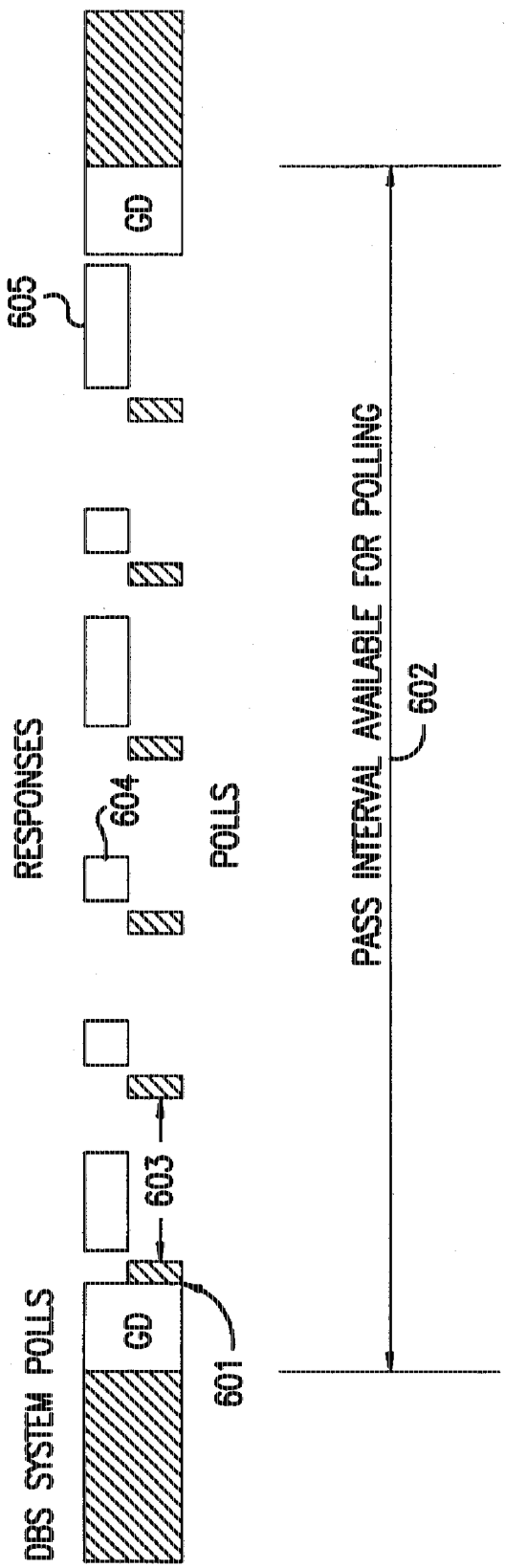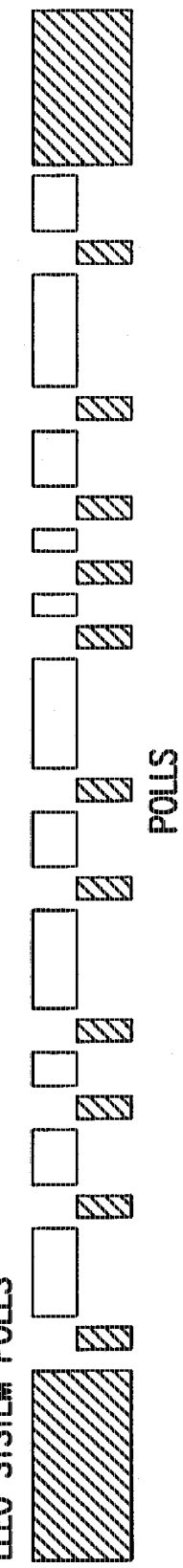

| GR ID | SUB ID | POLL COMMAND CODE | RESPONSE MESSAGE LENGTH | TIME UNTIL DELIVERY | TIME FOR RETURN | CRC |
|---|---|---|---|---|---|---|

FIG.7A

| GATEWAY ID | SUB ID | SP ID | PACKET DEFINITION | PACKET LENGTH | COND ACC | VIEW STAT | OTHER DATA | TIME CODE | MORE TO COME | BUFFER FULL |
|---|---|---|---|---|---|---|---|---|---|---|

ENCRYPTED (spanning COND ACC through BUFFER FULL)

FIG.7B

METHOD AND APPARATUS FOR USING SATELLITES FOR REVERSE PATH COMMUNICATION IN DIRECT-TO-HOME SUBSCRIPTION INFORMATION SYSTEMS

BACKGROUND OF THE INVENTION

1. Technical Field

The present invention generally relates to the application of a low earth orbiting (LEO) satellite to provide a return path for narrowband information, for example, low speed data, from subscribers to originators of direct-to-home subscription information delivery services such as television programming services and, more particularly, to a method and apparatus for storing data at a subscriber terminal and, responsive to a poll, transmitting the stored data to the low earth orbit satellite.

2. Description of the Relevant Art

At the World Administrative Radio Conference in February of 1992, certain frequencies were allocated on a worldwide primary shared basis for a new non-voice, non-geostationary orbit, mobile satellite service (NVNG-MSS): in particular, the 137–138 MHz, 148–150.05 MHz and 400.15–401 MHz frequency bands, all of which contemplated bands falling below 1 GHz. The United States Federal Communications Commission, in its Report and Order released Nov. 16, 1993, modified these frequency allocations slightly to comprise the bands 137–138 MHz and 400.15–401 MHz for space-to-Earth communications and 148–150.05 MHz and 399.9–400.05 MHz for Earth to space communications.

In connection with the allocation of transmission frequencies, the term "little" low earth orbit satellite system originated. Low earth orbit satellites are also contemplated for application at frequencies above 1 GHz, such as the so-called Iridium system, and these satellites have been named "big" low earth orbit satellites. Hence, the term little low earth orbit (LEO) satellite systems generally refers to systems in which radio transmission frequencies below 1 GHz have been allocated.

Geostationary satellites have been utilized for a number of years to provide intercontinental telecommunications services. A geostationary satellite is positioned so as to revolve around the earth at the identical speed of the earth's rotation at such a distance as to neither escape the earth's gravitational field nor eventually drift toward the earth nor move substantially relative to the earth's surface. Thus, the satellite does not move relative to any position within its reach such that a receive/transmit antenna would need to "track" or move to follow its movement in order to obtain acceptable signal reception. This orbit, the so-called geostationary orbit, or "Clarke" orbit, is at 35,786 kilometers, or 22,247 miles, a distance at the speed of light requiring a two way real-time delay in the range of tenths of seconds to traverse. The geostationary orbit satellites have proven ideal for wide band (such as television) one way communications where absolute delay is not a problem.

Examples of direct-to-home and/or direct broadcast satellite systems are described by U.S. Pat. Nos. 4,642,688; 4,652,903; 4,697,277; 4,866,770, issued Sep. 12, 1989; U.S. Pat. Nos. 4,885,775; 4,890,321; and 5,359,601. Recent disclosures of a recent direct-to-home DTH satellite system including M.P.E.G. compression include U.S. application Ser. Nos. 08/160,827, 160,828, and 161,160 all filed Dec. 3, 1993. All of these patents and applications are herein incorporated by reference as to any material deemed essential to an understanding of the present invention.

The new proposed low earth orbit (LEO) satellites for NVNG-MSS service will not suffer from the difficulty of real time delay; they are positioned so close to the earth. For example, low earth orbit satellites may be positioned, for example, in polar, north-south orbits at distances from 250 km to 1500 km; these may be inclined or non-inclined. On the other hand, these satellites will travel at such a speed relative to the earth that their "footprints" or earth surface coverage at the same power level will be far smaller and be traversed within periods as short or shorter than thirty minutes, depending on their altitudes.

The first such low earth orbit communications satellite, the Telstar only was capable of providing communication between Europe and the United States during a thirty-six minute window while it was visible from both sides of the Atlantic Ocean. Hence, in the history of satellite communication, there has been a move away from disadvantageous low earth orbit satellites to geostationary orbit satellites. Now, the interest in low earth orbit satellites is increasing due to the need for non-voice, relatively narrowband information or slow speed data communications.

Referring briefly to FIG. 1, there are shown sample visibility "footprints" for low earth orbit satellites at 250 km and at 750 km., assuming the satellite were standing still relative to the earth's surface. This figure is taken from the paper: "Introduction of LEO Satellites Below 1 GHz Sharing in the Uplink Band", Technical Report RP 328 (Issue 2) by K. Brown, September, 1992, incorporated herein by reference as to any subject matter deemed essential. In actuality, the LEO satellites will be moving north-to-south in one pass of the North American continent and south-to-north in a second set of passes. Their passes will cover different footprints with each north-to-south or south-to-north pass as the earth rotates beneath them.

In their Apr. 25, 1994 amendment to their application to the U.S. Federal Communications Commission, STARSYS Global Positioning, Inc. published what herein appears as FIG. 2, a representative coverage of twenty-four such LEO satellites at a point in time. Practically the entire earth's surface is covered. Moreover, according to their chart shown herein at FIG. 3, depending on the latitude, twenty-four such satellites will in fact predictably cover 100% of the earth's surface. In other words, one satellite or another will be visible from forth-eight degrees latitude 100% of the time.

According to the applications of some of the will-be LEO satellite service providers, (Orbcomm's first prototype satellite, for example, launched in 1993 is already served by two Earth stations or gateways announced in October of 1994), services provided will include irrigation and agricultural applications, truck fleet and cargo tracking and monitoring, vending monitoring, emergency and disaster services, environmental services, E-mail delivery, paging services and utility meter reading applications.

Communication from Earth to space may require eighteen foot high tracking antennas protected by a radome. Multiplexing techniques among the proposed systems vary from code division multiple access CDMA to frequency division FDMA to time division multiple access TDMA and combinations of such technologies such as CDMA/TDMA. It has been known since the 1960's that narrow-band, non-voice communication, for example, at rates of 2400, 4800 bps or even lower rates, can be spread according to so-called spread spectrum transmission schemes over a wide frequency band, for example, 50 khz, so that coded data transmitted spread over the wide spectrum may be recovered out of background noise. Thus, relatively low power transmissions with accurate data recovery may be achieved at the satellite and even at a relatively inelegant mobile transceiver communicating therewith equipped only with a whip dipole antenna. Spread spectrum communication in a cable television environment is described by U.S. Pat. No. 4,912,721, issued Mar. 27, 1990. Nevertheless, the LEO applicants have been cautioned to not interfere with communications of others having proximate earth stations and similarly constructed satellites or of non-service users licensed to use similar frequency bands in other countries.

Besides STARSYS, two other first round applicants include VITA and ORBCOMM. Referring now to FIG. 4, there is shown forward (FWD) and return links for each of STARSYS, VITA and ORBCOMM and their respective frequency allocations. Other applicants will be permitted to utilize other presently unutilized portions of the available frequency bands. Also shown are the proposed multiplexing techniques chosen for each, to data, namely, FDMA and CDMA.

Each of the applicants contemplate the ability to provide both "bent pipe" and store and forward data services. Bent pipe services means that for mobile transceivers and Earth stations concurrently within the satellite's footprint, data communication can occur directly from the mobile transceiver to the Earth station gateway. Store and forward services mean providing the satellite with data storage memories for storage of data retrieved from mobile transceivers for later transmission to an earth gateway as the satellite moves from the footprint including the mobile transceiver to the footprint including the Earth station gateway. For example, data collected over China can be stores on board the low earth orbit satellite and subsequently be delivered to an Earth station gateway in the United States.

Moreover, certain of the different services contemplated will include access to accurate time-of-day transmission and, through triangulation, accurate positioning to within 100 meters via the LEO satellite. In this manner, for example, a plot can be automatically achieved over time of a cargo carrying a mobile transceiver as the cargo moves from one location in the world to another over time. Contemplated messages then will have lengths on the order to 100–500 bits and may include time, position or other data from a given mobile transceiver, with an expected average transmission length of 200 bits. A DTH cable television system in which satellite accurate time-of-day terminal update is periodically provided is described by U.S. Pat. No. 4,994,908 incorporated herein by reference as to essential subject matter.

Consumers of television and information services generally are becoming increasingly interested in the prospect of receiving information or television programming services through direct broadcast satellite (DBS) or other direct-to-home (DTH) subscription information systems. These have typically utilized geostationary satellites for transmission from an Earth station to a television signal decoder/receiver. Some of the information or television programming services contemplated today include digital audio, software, news, burglar or fire alarm, energy management, television, games (including gambling), imaging (including X-ray, photographic, MMR and other imaging), facsimile and other information services too numerous to mention. In satellite systems, geostationary satellites are used to broadcast audio, video and data over the C-band (approximately 3.7–4.2 GHz downlink) and Ku-band (10.95–14.50 GHz) directly to small receiving antennas on consumer premises, all of which bands being above 1 GHz. Advances in satellite technology have enabled DBS systems to offer more than 100 channels of color television from a single satellite. This can be achieved for both television and audio through internationally recognized M.P.E.G. compression standards.

DBS system operators recognize that this expanding market would be best served if a variety of programming packages, including basic programming services, premium services, pay-per-play, pay-per-view services, and other conditional access services were offered. DBS systems can implement the assorted programming packages using scrambling, encryption and other conditional access techniques. However, a reverse communication path from the consumer premises to the DBS system operator is required for communicating program selections, for example, among other subscriber information. One system operator has suggested the utilization of plug-in credit cards which credit may be replenished at stores or kiosks or through the mails.

Current direct-to-home (DTH) receivers, for example, cable television receivers, store subscriber information and then forward the subscriber information to the DTH system operator through the telephone network. However, in many applications, telephone networks do not provide an adequate medium for reverse path communication. For example, reverse path communications would not be possible in remote areas that lack ready access to a telephone network. Moreover, telephone communications rates and tariffs may be prohibitively expensive for short duration, 200 bit long messages. In addition, telephone networks are inadequate for implementing a reverse path in DBS systems whose service areas cover large areas (e.g, global systems) and/or include several countries.

In DTH cable systems, the cable may provide a return path, for example, at radio frequency. In one such systems described by U.S. Pat. Nos. 5,109,286; 5,142,690, issued Aug. 25, 1992; U.S. Pat. Nos. 5,155,590; 5,225,902; 5,235, 619, issued Aug. 10, 1993; U.S. Pat. No. 5,251,324, issued Oct. 5, 1993, discussing viewing statistics return in some detail; and U.S. Pat. No. 5,255,086, issued Oct. 19, 1993, one or more bands of upstream channels are utilized and channels selected for data communication to avoid noisy channels or bands. However, such cable return paths are limited by the length of the cable. Eventually, telecommunications paths must be relied upon to forward data related to the acceptance of subscription services by a subscriber to a remotely located service originator. Telephone return paths are described by U.S. Pat. Nos. 4,792,848; 5,053,883 (terminal polling method); and U.S. Pat. No. 5,270,809.

In their application for NVNG-MSS dated Nov. 16, 1994 before the Federal Communications Commission, E-SAT, Inc. proposes to provide messaging services for the gas and electric utility industry, data messaging and retrieval in support of direct-to-home broadcast satellite service. In particular, there is described a service in which it is estimated that "DBS viewing" data may comprise 1.8 million "meters" generating 60 bytes per reading, once per week. Moreover, it is estimated that in the downlink (from LEO to DBS subscriber) only 100 bytes per day would provide a DBS menu. These data may comprise "program offerings and viewing subscriptions." A combination of CDMA/TDMA is suggested for transmission/reception technique. Polling is preferably in a so-called "automatic mode" in which each group of transmitting meters commences uplink transmission (to the LEO) at a pre-designated time slot (for example, when the satellite orbital position corresponds to a minimum range from a data collection center or a central reference geographical location with respect to the group of terminals involved) in an automated fashion. The predesignated start (and end) times for each group of meters are computed on the basis of the selected orbital configuration, TDMA time frame and group distribution patterns. All the ground terminals (meters and data collection centers) are preprogrammed to maintain a clock synchronized with a network control center to facilitate the start and finish of simultaneous (CDMA) transmissions from all the members of a particular group within the appointed time slot, and the (TDMA) access to the satellite by different groups during their respective time slots. The universal clock may be supplied by the network control center or the satellite itself with periodic update on synchronization of the whole network.

In a prompt mode according to the proposed E-SAT system, each group transmits its data on being prompted by a downlink signal received from the satellite in a broadcast mode. Each meter within the group(s) must be activated by the prompting signal for its transmission to be triggered. This "prompt mode" is proposed as a contingency back-up to automatic mode and for direct control purposes.

U.S. Pat. No. 5,291,554 to Morales discloses a two-way interactive satellite transmission system that broadcasts program material from a comprehensive warehouse of materials upon request to individual subscribers. A program storage and processing center is capable of broadcasting subscriber-selected programming to the subscriber via a satellite. A 218 MHz two-way communication channel links the subscriber with a local area repeater. The local area repeater is in communication with a control center and the program storage and processing center via satellite links. Program selection, billing information, software, and decryption keys are communicated from the subscriber premises to the local area repeater via the 218 MHz two-way communication channel. The local area repeater can then transmit the collected information from a plurality of such subscribers to the control center via satellite links.

U.S. Pat. No. 5,257,099 to Morales-Garza discloses a wide area satellite communication audience response system capable of being used for billing and accounting for special programs. An audience response center is coupled to various local area repeated stations via a two-way satellite communication network. Each repeater station communications with a number of subscriber response units over a narrow band single frequency channel (e.g., 218 MHz) using a series of RF "beeps" located in timing slots specific for each subscriber. Thus, the repeater stations and response units each include RF transmitters and receivers to enable communications therebetween. Television programming is delivered to the subscriber by other means.

U.S. Pat. No. 5,367,330 to Haave et al. discloses a pay-per-view television delivery system in which pay-per-view programming originating at a control station are transmitted, for example, over a satellite network. The satellite network delivers pay-per-view television programming to substations, which in turn deliver the pay-per-view television programming to subscribers via conventional distribution systems. Pay-per-view selections are communicated from the subscribers to the substations through telephone lines or through two-way cable systems.

U.S. Pat. No. 5,357,276 Banker et al., assigned to Scientific-Atlanta, Inc., the assignee of the present invention, is directed to providing video-on-demand (VOD) programming that emulates VCR-like functions such as pause, rewind, and fast forward. For restricted access programming events, reverse path communications may be achieved via the telephone network or, in cable systems, via a reverse channel of the cable distribution system.

U.S. Pat. No. 5,329,590 to Pond discloses an automated initialization and activation procedure for receiving pay-per-view programming events on an integrated television receive-only satellite broadcast receiver/descrambler (IRD). Accordingly, a subscriber can set his IRD to initialize, activate, and receive a pay-per-view event for recording on a VCR, for example, in the subscriber's absence. Program selection and billing information are communicated from IRD to the system operator via the telephone network.

U.S. Pat. No. 5,151,782 to Ferraro concerns a satellite pay-per-view television delivery system in which a subscriber places an order for a scheduled pay-per-view event with a programming originator over the telephone network.

While low earth orbit satellite systems are contemplated, their utilization for various applications is still in the exploratory stages of development. Even the E-SAT NVNG-MSS fails to describe a viable return path for subscription information service acceptance data in concert with a DTH subscription service delivery system. There still remains a need, notwithstanding prior art ground-based systems such as telephone and cable return paths and combination RF broadcast to local repeater to satellite return paths, for an efficient, reliable return path for returning data from a subscriber location to a service originator in a direct-to-home subscription information delivery service system such as a television programming system.

SUMMARY OF THE INVENTION

In general, the problems of the prior art are overcome by the principles of the present method and apparatus for providing a low earth orbit satellite return path for data from a subscriber location to a service originator. More particularly, the present invention involves using low earth orbiting (LEO) satellites to gather data from the subscriber's DBS or DTH receivers. Each DBS or DTH receiver records the information or television programming or other subscription services ordered by the subscriber and various other subscriber statistics in terminal or receiver memory. Then, the stored data is returned with a subscriber identifier directly via the "bent pipe" or on-board satellite store-and-forward techniques to a serving gateway for further transmission to the service provider.

Moreover, the LEO return path may be used for poll responses for any number of applications only limited by the imagination, including conditional access data, viewing statistics data, home shopping data, subscriber messaging, service request data and other applications. As a LEO satellite passes over a particular region, the LEO satellite or the geostationary satellite polls each DBS or DTH receiver in sequence and requests that stored data be transmitted back to the LEO satellite for temporary storage on board or for "bent pipe" transmission direct to a gateway within its footprint. The LEO satellite downloads the collected response data to a ground or Earth station gateway as it passes over the ground station either immediately or subsequently.

The LEO satellites may be typically launched into a north-south polar orbital plane having an orbital period of about 90 minutes. As a consequence, and as a result of the earth's rotation, a LEO satellite will appear over any region of the earth at least once a day, whether it is a subscriber or the location of the service originator or gateway. Thus, a LEO satellite has the ability to gather data each day from any location on the earth's surface and subsequently return the data to an earth location such as the system gateway.

More specifically, the subscriber's DBS or DTH receiver may be equipped to store relevant subscriber information, such as program selections, as it is generated. The DBS or DTH receiver may include a data port that is coupled to a VHF transmitter having a low gain broadbeam antenna. For example, the VHF transmitter may transmit VHF signals over the coaxial drop between a DBS-antenna-mounted low noise amplifier (LNA) and the DBS receiver. A diplex filter at the DBS receiver and the LNA can be used for separate the VHF reverse path signal and the incoming DBS signal. In addition, the antenna for the reverse path may comprise a VHF dipole antenna mounted on the periphery of the DBS parabolic dish antenna. Alternatively, the dipole antenna for communication with the LEO satellite may be mounted in the vicinity of the so-called low noise block (LNB) converter where DBS or DTH signals from the geostationary satellite are collected. In a cable television DTH environment, the cable television receiver may be simply equipped with a dipole antenna operative at less than 1 GHz for LEO satellite communication only.

As the LEO satellite passes overhead, it broadcasts an addressability signal that is vectored to each DBS or DTH receiver in turn. In response to this signal from the LEO satellite, the DBS or DTH receiver, having assured itself that the poll is valid and the receiver has been properly addressed, partitions the stored data that has been requested in the poll into packets and outputs the low data rate packets to the VHF transmitter which in turn transmits the data over the VHF dipole antenna. Accordingly, low power, low data rate communications between the LEO satellite and the DBS receiver can be accomplished using the FCC allocated lower frequency VHF frequency band. Alternatively, low power communications may be carried out in the higher UHF band.

As described above, the DBS or DTH receiver can transmit to the LEO satellite data relating to the current acceptance of information services by a subscriber including, for example, buying status of conditional access programming broadcast by the DBS satellite or provided via cable or other direct-to-home means. The LEO satellite may store the data received from the DBS or DTH receiver and later download the data to a ground station gateway accessible to the DBS or DTH service provider. Accordingly, the DBS or DTH service provider can track, bill, and extend credit to the user of the satellite or DTH service receiver over either the LEO or DTH path, and preferably the DTH path, according to the present invention.

Also, according to the present invention, at least time-of-day, receiver location, programming guide and other data may be broadcast, group addressed or individually addressed to a DBS or DTH receiver via addressed data packets over the DTH service path. Related response data can close the loop with the service provider so as to offer terminal security, piracy detection, and a multiplicity of additional service advantages.

For example, in a subscriber messaging application, an addressed subscriber message may be delivered to another subscriber within one day as the LEO satellite passes over the addressed subscriber's premises. Of course, the message may comprise an image, a facsimile, an E-mail message or other compressed slow speed, non-voice communication. In another embodiment in which multiple gateways are provided in different geographical areas, for example, for multiple information service providers or other service providers, the data transmitted by the LEO satellite may be particularly addressed to a service originator and to their first assigned gateway or an alternate default gateway.

Further advantages and applications of the present invention will become apparent from a careful consideration of the following detailed description of the present invention, a method and apparatus for using satellites in a low earth orbit for reverse path communications in a direct-to-home subscription information delivery system.

BRIEF DESCRIPTION OF THE DRAWINGS

FIG. 5A comprises a system block diagram of a proposed first embodiment of the present invention, wherein a geostationary satellite utilized for providing direct-to-home (DTH) subscription information services polls DTH receivers to respond as a LEO satellite is visible, the DTH receiver/decoder further including apparatus for storing conditional access, viewing statistics and other data for return via the depicted LEO satellite path to a LEO Earth station gateway.

FIGS. 6A and 6B comprise exemplary polling and response transmissions for each for the embodiments of FIGS. 5A and 5B, FIG. 6A showing a predetermined guard band between polls for obtaining responses in a DTH or DBS polling system according to FIG. 5A and FIG. 6B showing how polls may be initiated immediately after responses in a LEO polling system according to FIG. 5B.

FIG. 7A shows a typical downlink data packet construction from a polling LEO or geostationary DTH satellite, in particular, via a group addressed or individually addressed data packet.

FIG. 7B shows a typical response data packet for either bent pipe or store and forward delivery to a gateway and from the gateway to a subscription information delivery or other service provider (SP).

DETAILED DESCRIPTION OF THE INVENTION

Figure 1:
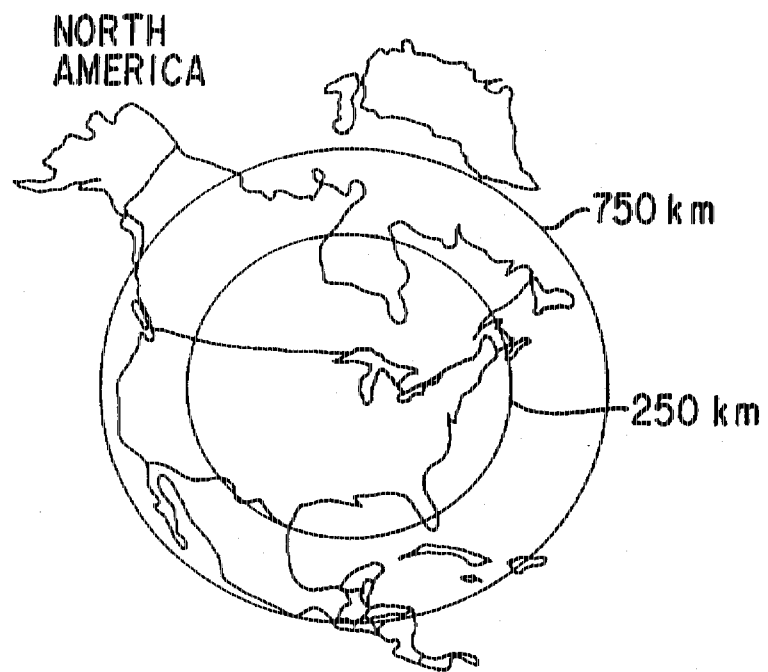
FIG. 1 is a map of North America showing example visibility areas for low earth orbit (LEO) satellites at 250 km altitude and 750 km altitude.
Figure 2:
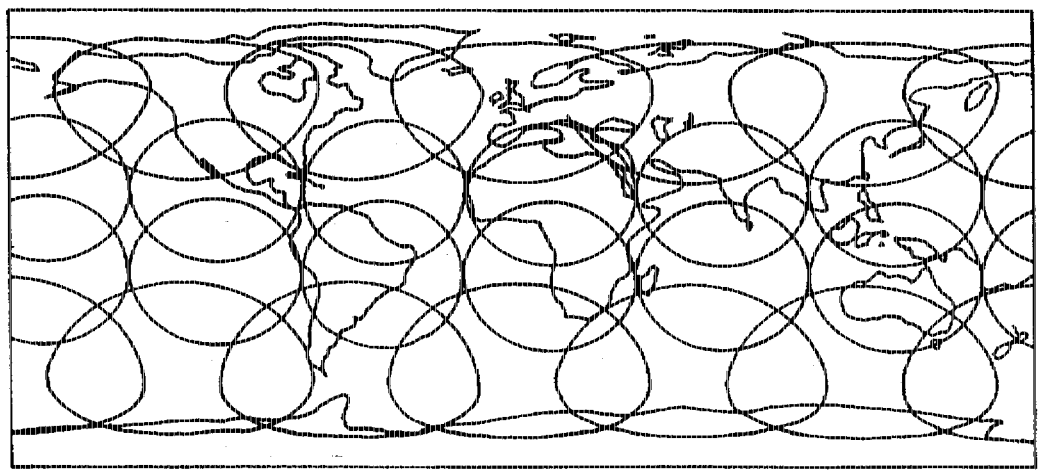
FIG. 2 is a condensed map of the world showing representative coverage of twenty-four LEO satellites at a particular point in time.
Figure 3:
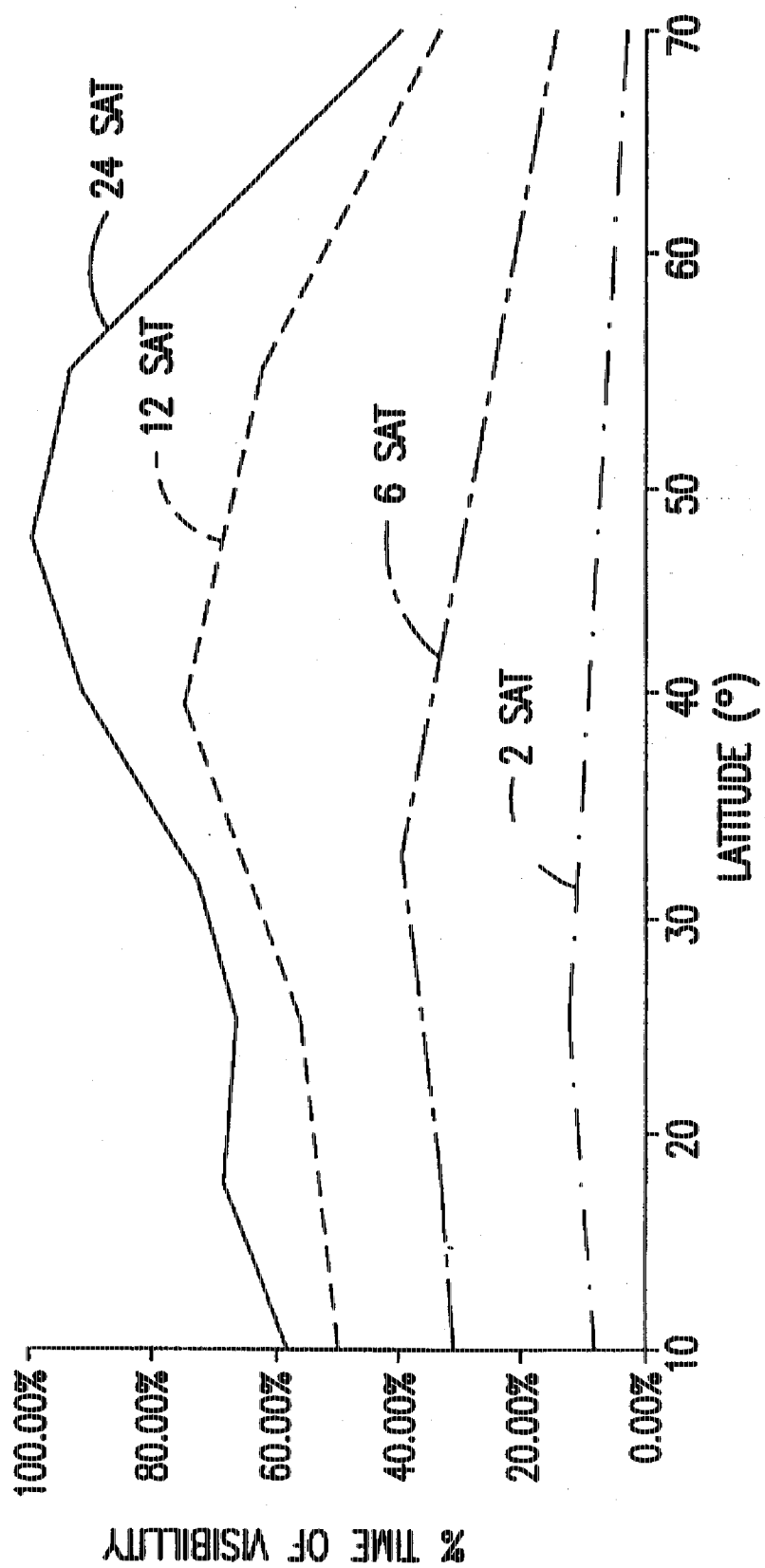
FIG. 3 is a graphical chart showing constellation coverage statistics wherein the Earth latitude is shown as one axis and the percent time of visibility of a two, six, twelve and twenty-four LEO satellite system as the other axis.
Figure 4:
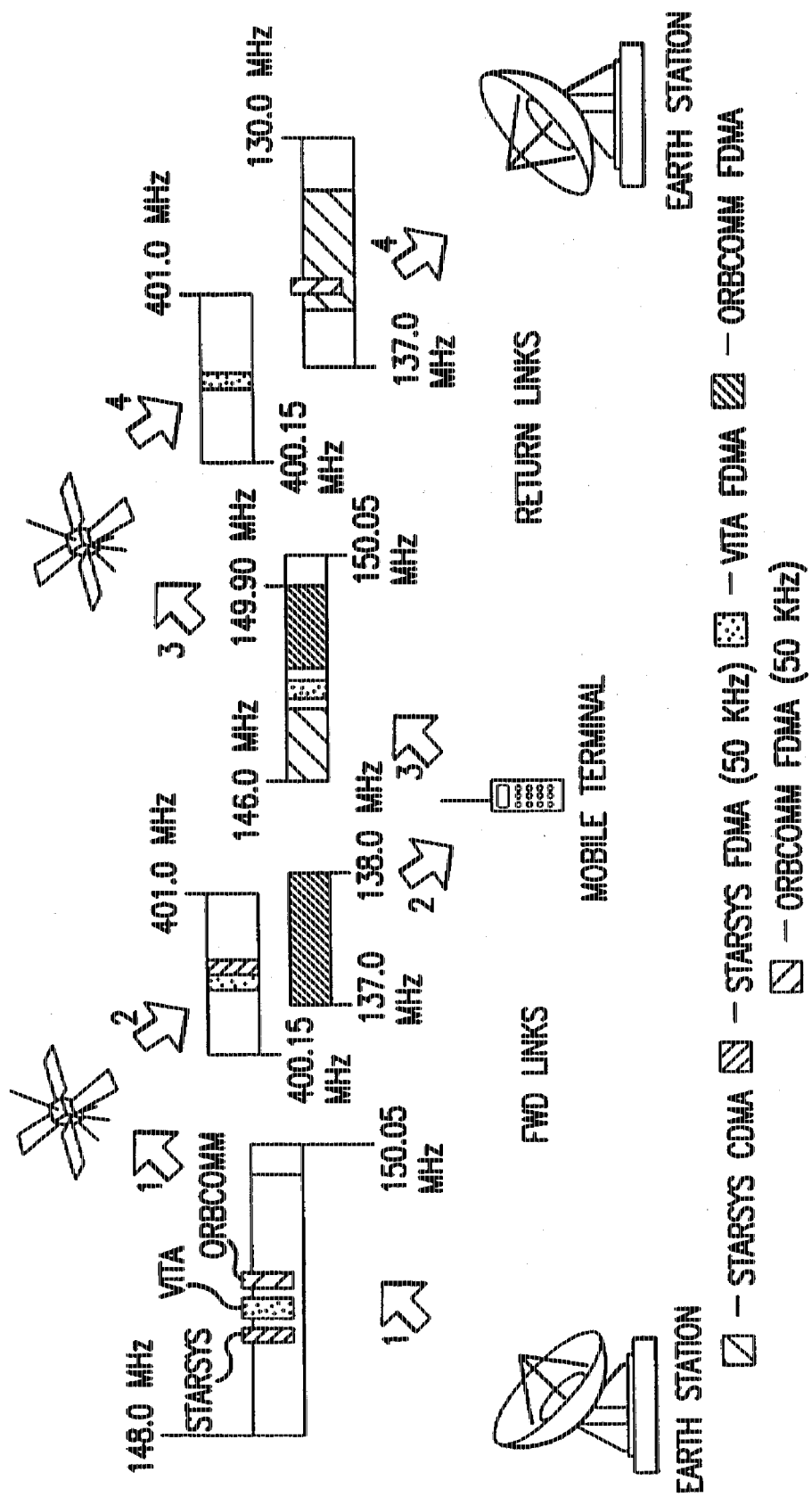
FIG. 4 is a drawing showing proposed STARSYS, VITA, and ORBCOMM forward (to the mobile transceiver) and return (to the Earth station gateway) links, further showing channels and proposed multiplex schemes and allocated transmission frequencies.

Referring now to FIG. 5A, there is shown an overall system diagram of a subscription information services delivery system according to the present invention wherein a geostationary DTH or DBS satellite 1 in a geostationary orbit polls DTH or DBS integrated receiver decoders 2a, 2b, 2c–2n or other subscription service terminals. The integrated receiver decoders 2a–2n are equipped with circuitry to be described in more detail in connection with FIGS. 8–10 for transmitting stored data, for example, conditional access and viewing statistics data to a little low earth orbit LEO satellite 3 that is presently overhead as signalled by the appropriately timed poll signal of the DBS satellite 1. The stored data preferably is accompanied by a subscriber identifier to signal its ultimate destination and may be further accompanied by a gateway identifier and a service provider identifier in different combinations. The terminals 2a–2n may be grouped and sub-grouped according to time zones, information service preference, blackout regions, service boundaries, countries, states or the like or for other reasons as will be herein described. When a particular group is polled, the terminals transmit their responses in order to LEO satellite 3. The little LEO satellite 3 than either directly transmits the received response transmission directly to a LEO system base or Earth station gateway 4 if the decoders 2a–2n are concurrently within the same footprint as the Earth station 4 (bent pipe) or stores the data transmission for later transmission when the station 4 is within its footprint (on-board satellite store and forward).

In a system involving a plurality of gateways inside or outside a particular footprint with a responding terminal 2, a gateway identifier transmitted with the poll response may be used by a gateway to identify transmissions directed to it from the LEO satellite distinguished from transmissions intended for others. Moreover, a particular gateway 4 may request all store-and-forward data on board to be forwarded with its gateway identifier as a LEO satellite passes overhead.

The Earth station gateway 4 then retransmits the received response data for processing and analysis to communications center 5. Communications center 5 also receives LEO satellite pass timing information from a satellite operations center (not shown) which may be gateway 4 so gateway/station 4 can track the LEO satellite 3 as it passes overhead. Communications center 5 separates system responses belonging to other DTH or DBS systems from one another and from data for other users of their services and sends the poll responses to respective DTH or DBS accounting centers 6. The separation process may be facilitated by a master list of subscriber identifiers and/or system identifiers, these identifiers being transmitted with the responses. Stored data that may be sent in the clear (not encrypted) then aids in this data packet recognition and retransmission process such as gateway identifier, system service provider or unique subscriber identifier or other data. For example, packet characteristics such as header/data field lengths, or other data fields may identify packet destination to a gateway 4.

The DTH or DBS accounting centers 6 process the poll responses belonging to its system. The accounting centers 6 further transmit polling and integrated receiver decoder unit programming signals to DTH or DBS base station (Earth station) 7.

The DTH or DBS Earth station 7 initiates the polling of integrated receiver decoders 2a–2n belonging to subscription information service subscribers by transmitting group or individually addressed data packets with the serving information signal such as a television signal. In order to do so, the DTH or DBS Earth stations 7 receive a schedule of LEO satellite visibility from LEO communications center 5.

The system according to the present invention of FIG. 5A should not be construed to be limited to satellite direct-to-home subscription information delivery services. The present invention may be equally utilized in a cable or fiber optical system or other system in which telephone, cable or other known return path communications are unlikely. An example of one application of the present invention is with a B-type multiplexed analog components (B-MAC) type direct broadcast satellite (DBS) television system located in mountainous or other isolated regions where telecommunications or land line communications are practically impossible. In such a scenario, the present invention provides a viable alternative for a return communications low speed data path.

In general, data related to acceptance of subscription information services shall be defined to include any data, conditional access or viewing statistics or other data, related in any way to participation in a subscription information service, whether or not the particular information obtained by the subscriber is provided free of extra charge or for a fee.

In particular, it has been determined that conditional access utilization data may comprise an average message length of 25 to 30 bytes. Conditional access data may comprise, for example, pay-per-view, pay-per-play, or related subscription information service charge and utilization data. In accordance with the present invention, data reflecting a subscriber's usage of particular premium software or television programs, games or digital stereo audio or other premium program selections may be returned to the service provider. From experience, it has been determined that once per month polling is sufficient frequency for polling conditional access data. If one message is insufficient for transmitting all stored information, according to the present invention, the response data may continue to be forwarded at the next earliest opportunity.

Viewing statistics data may comprise an average message length of 10 to 15 bytes and include data describing viewing habits of a particular user, for example, the times of integrated receiver decoder usage and what channels the viewer watches and at what times of day. Over time, it has been determined, for example, the average subscriber views one of their televisions approximately five hours per day, with each day of the week having different characteristics. Consequently, once per day polling of viewing statistics data may be appropriate. In this manner, for example, a subscription program scheduler can determine which pay or subscription programs are more popular and, therefore, schedule them more often. Also, for example, a user of a copyright for copyrighted material can properly account for its actual viewing/listening/playing audience.

Of course, practically any return data opportunity available via a land line is achievable according to the present invention, especially as low earth orbit satellite coverage is improved over time. In this manner, many low speed, non-voice data services such as energy management, security or alarm, viewer polling/voting, home shopping, program or service selection data, messaging, imaging, facsimile services and the like may be accomplished over the LEO return path. Each of these applications may involve response data packet construction and polling frequency which are individually defined in terms of data fields, expected message length and the like or may permit polling in common with other applications and share a common response packet definition.

Furthermore, terminal 2a–2n security is improved as a return path is provided in a DTH or DBS system, otherwise not equipped with a return path. For example, it may not be known to a DBS service provider when and if a service pirate has broken an encryption or scrambling lock. According to the present invention, terminals may be required to response periodically in a particular manner, for example, by transmitting a unique identifier, for example, a secure memory stored unique terminal secret serial number or transceiver chip set identifier or combination thereof. If there is no response or an incomplete response, the terminal or transceiver or both can be deactivated by means of an addressed data packet via the service link 7,1,2.

With the LEO return path system according to the present invention, terminals can be located within one hundred meters anywhere on the earth. That is, the exact latitude and longitude coordinates of a particular terminal may be obtained through triangulation techniques and those coordinates returned to a service provider. The coordinates can then be compared with Earth maps to determine Earth address locations within 100 meters accuracy. Thus, service providers can relocate and bill subscriber pirates who would attempt to relocate their terminals and themselves away from an original address.

According to the present invention, in the embodiment of FIG. 5A, alternative methods for determining terminal 2a–2n location may be utilized. For example, location data may also be calculated, over time, within a similar degree of accuracy via the path 7,1,2,3,4. Since the locations of 7,1,3, and 4 are known at the time of a particular poll, the respective distances between them known, the synchronized times of polling and respective transmissions from 7,1,3 and 4 known, then the location of any terminal 2a–2n may be located by comparing multiple transmissions carrying the subscriber identifier as the satellite 3 changes its position relative to terminal 2 with each pass over terminal 2.

Moreover, in another exemplary method, a poll response may be requested from base station 7 at a point in time when overhead satellite 3 and the next LEO satellite are both overhead terminal 2. Both LEO satellites then receive the same response from terminal 2 at different times. Since their locations are known, an Earth station can thus determine the location of terminal 2 relative to other terminals. This method assumes a larger LEO satellite population such that with some degree of frequency, two satellites will be visible from a terminal at the same time.

The embodiment of FIG. 5A has the advantage that any modification of the integrated receiver decoder 2a or other terminal only needs to include a LEO transmitter. No LEO polling receiver need be provided. All polling requests are transmitted and scheduled via the existing link from 7 to satellite 1 to decoders 2a to 2n. The costs of modification of the integrated receiver decoders is thus minimized. The decoder 2a, responding to its group or individual address, simply transmits its stored conditional access, viewing statistics or other stored data to LEO satellite 3; its does not need to be equipped with a LEO polling receiver. Such a receiver is expensive in comparison to other transceiver components. For example, satellite power in the downlink (from LEO satellite to receiver) is limited. The terminal receiver must rescue the low satellite transmitted power with a relatively inefficient dipole antenna. In the other uplink direction, the terminal transmitter may be simple by comparison because an expensive, shared receiver can receive the repeated transmission at gateway 4. Moreover, since the LEO satellite does not poll, the costs of LEO satellite utilization (primarily costs of tariffs) are effectively halved.

Figure 5B:
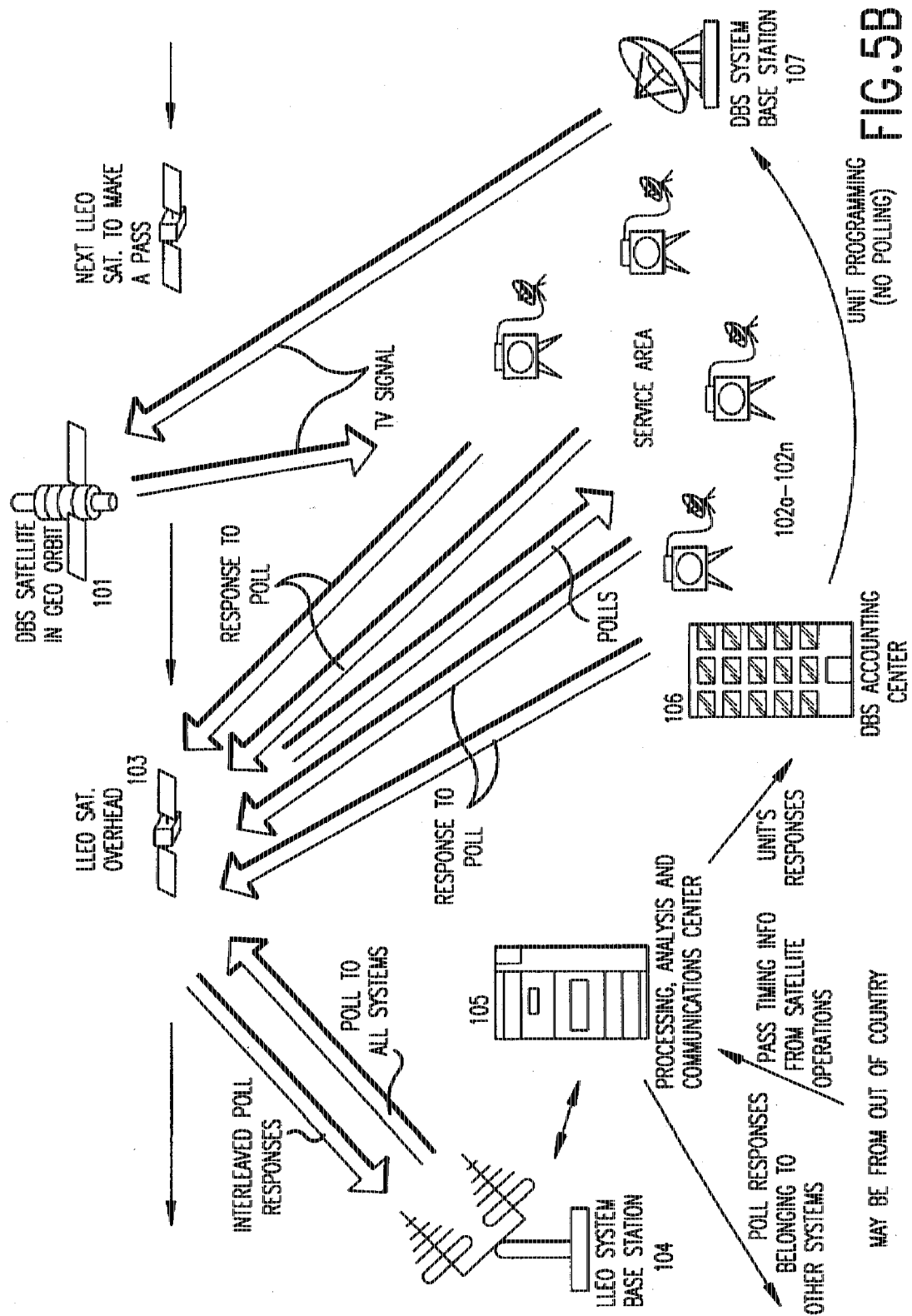
FIG. 5B comprises a system block diagram of a proposed second embodiment of the present invention, wherein the LEO satellite system provides both a forward and return path for polling and response transmissions and subscription information services are provided via a geostationary satellite or ground lines.

FIG. 5B shows a second embodiment of the system according to the present invention in which the little low earth orbit LEO satellite 103 handles the polling as well as the responses; the geostationary satellite 101 is not used for polling. In this embodiment, the DTH or DBS satellite 101 transmits an uplinked subscription information signal, such as a television signal, to integrated receiver/decoder units 102a to 102n or other subscription service terminals in its service area. No polling signal to obtain conditional access or viewing statistics or other return path data is transmitted with the subscription information signal.

In stead, satellite pass timing information is provided to communications center 105 which schedules a polling via little low earth orbit satellite Earth station or gateway 104. Earth station 104 transmits the polling request to LEO satellite 103 which can either directly obtain a response via bent pipe means or must store the polling request on board the LEO satellite until decoders 102a to 102n are visible and within the footprint of LEO satellite 103.

In order to accomplish store and forward polling, the LEO satellite 103 may require in addition to on board memory a controller to schedule an appropriate time of poll duration from the time of receipt of the polling request. This can be achieved by transmitting with the polling request to the satellite a clock count representing the interval until the poll is to begin. For example, in this manner, a poll initiated in the United States can occur of a group of receivers 102a–102n in Australia. On the return path to the LEO service Earth station gateway in a LEO satellite polling embodiment, the gateway 104, with a single command, may request dumping of all stored data with its gateway identifier or by other means, so a similar counting or timing function is not necessary.

Similarly, the several integrated receiver decoders or other terminals 102a to 102n must be adapted to receive the polling signals and generate non-colliding responses to the polls according to whether they respectively have stored data to transmit and whether they have been addressed, either as a group or individually. Collision avoidance techniques are well known and may involve subscriber terminals in a polled group appropriately staggering their responses according to a predetermined message length per subscriber. For example, terminal polling and collision avoidance are described by the US patents described above describing data return including U.S. Pat. Nos. 4,792,848, 5,053,883 and 5,270,809. The stagger or delay of one subscriber terminal relative to another may be determined by the number of terminals in the group multiplied times its number in the group times the length in time of the predetermined message length in clock counts. Other collision avoidance techniques used in telephone or radio frequency cable return impulse pay-per-view (IPPV) systems may be used equally as well to advantage in the present invention. Moreover, in CDMA systems, collision avoidance is not as severe a problem as in, for example, FDMA systems. Consequently, CDMA is preferred for LEO satellite uplink transmission.

The several responses to polls are forwarded as in FIG. 5A to an accounting center 106. There the conditional access, viewing statistics or other requested or volunteered data may be assembled and processed. Integrated receiver/decoder unit programming control signals are forwarded to DTH or DBS base station 107. No polling request signals are forwarded because it is assumed that the geostationary satellite is not to be used for polling.

A hybrid system may also be provided according to the principles presented by both FIGS. 5A and 5B in combination. In such a hybrid environment, it may be advantageous to poll certain integrated receiver decoders or other subscription service terminals in the same serving area by means of the LEO satellite and others in the same serving area by the geostationary satellite in some applications of the present invention. In especially mountainous regions of the world, a decoder in a severely walled valley may not be visible from a low earth orbit satellite for a sufficient time to enable efficient and reliable transmission. Even through the transmission may only require a fraction of a second for a two hundred bit message, the satellite traveling at approximately 18,000 miles per hour will pass over too quickly to be polled especially when the LEO satellite does the polling. On the other hand, in geostationary satellite polling according to FIG. 5A, especially Ku band signals, used in such systems, are highly susceptible to weather, especially rain or clouds, which can effectively attenuate, if not, terminate communication. Thus, it may be appropriate to group address or individually address or poll different subscribers in the same serving area by different means, LEO satellite polling for some and geostationary satellite polling for others.

Referring to FIG. 6A, there is shown an exemplary polling scheme according to the present invention for the system of FIG. 5A in which the geostationary satellite does the polling. The DBS system polling is shown in shaded exemplary time boxes and the unit responses are shown in white boxes. FIG. 6A is intended to show that in a particular serving area served by a particular geostationary orbit satellite for a particular DTH subscription information delivery system, there can be an anticipated maximum duration response time or an allocated maximum guard band for each of the subscriber groups in that area. Thus, at point 601 a poll is initiated of a first group of subscribers at a time when a LEO satellite is passing and visible overhead. The pass interval duration 602 represents the total pass interval available for polling of six groups of subscribers for that pass of the LEO satellite. All the subscribers in an addressed group in the serving area are expected to respond in turn. If one multiplies a maximum number of subscribers in a group by a maximum message length of anticipated responses, one can arrive at a maximum guard band represented by the duration 603. Moreover, the guard band 603 should be increased beyond this calculated duration to compensate for satellite system delays. However, in actuality, certain groups of subscribers will only take up a short response time duration 604 while another polled group may consume response time duration 605, which borders on the maximum guard band allowable 603. Thus, there is wasted time during polling when responses from addressed subscribers could be received and are not being received.

Alternative approaches to this problem are now described in some detail. For example, over time, group sizes may be redefined and their composition intentionally changed as conditional access, viewing statistics and other data are accumulated for the addressed groups so that the maximum guard band time duration 603 may be decreased in length. Other techniques will be further described herein wherein an individual subscriber may be allocated a predetermined message length for a particular pass of a satellite and then signal that there is more data to come on the next or a subsequent pass via a more-to-come flag transmitted with a portion of the response data for that subscriber. In this manner, a particular subscriber may be redefined over time as a member of plural groups so that more data may be collected from that subscriber in the same pass. Alternatively, that subscriber may be repeatedly polled over several passes to accumulate all retrievable data.

It is not absolutely necessary for a system to obtain daily responses from each subscriber. It has been shown from experience with conditional access responses that a data collection on the order of once per month may be acceptable. That is, the average subscriber only purchases a handful of events per month identified, for example, by channel number and time-of-day of reception or, in other systems, by event identifier or other means. On the other hand, it may be appropriate for the subscriber response message to include an optional buffer full flag if the particular subscriber is a heavy user of subscription information services. The buffer full flag may signal that DBS accounting center (FIGS. 5A or 5B) to provide that subscriber with a larger size memory or poll the subscriber more frequently. The buffer full flag may be utilized in either the system of FIGS. 5A or 5B.

In accordance with FIG. 6B, there is shown a polling arrangement whereby the LEO satellite does the polling as per the system of FIG. 5B. In such a system, the LEO satellite system will recognize the end of respective transmission from a first group of subscribers and then, after a brief period to assure that no others of the polled group are responding and to compensate for satellite system delays, begin polling of the next group of subscribers. In this manner, there is shown the receipt of response transmissions from eleven groups of subscribers. In this embodiment, there is no wasted time during the pass interval. The low earth orbit satellite is capable of polling and obtaining responses continuously during the pass interval available for polling. The number of groups of subscribers polled may vary from pass to pass, but there is no wasted time.

Referring now to FIG. 7A, there is shown a typical downstream or downlink polling transmission comprising a group addressed or individually addressed transmission. In accordance with LEO parameters and typical addressed data packet lengths for some known subscription information service delivery systems (SIS), the total message length is constrained to approximately 200 bits or fifty bytes, but may require as much as 100 bytes as will be described further herein depending on the polling packet format selected (for example, when multiple response data types, rather than one form of response data, are requested). A header of the message packet comprises a particular structure determined by the LEO or SIS service provider by typically comprises a group address or identifier (GR ID) included for identifying the group of subscribers polled. The group address must be of sufficient length to uniquely identify a plurality of groups served by a SIS service provider within reach of or visible to a passing LEO satellite. The header may also include an individual terminal address (SUB ID) for polling an individual terminal or integrated receiver decoder (not shown). The SUB ID uniquely identifies a terminal or, in other applications, may uniquely identify a subscriber having plural terminals. The header also typically includes a command definition field (poll command code), the command definition field defining the expected responses. For example, a first command code may represent a request for conditional access data, a second command code for viewing statistics data and so on. Further, a field may be provided for defining predetermined response lengths (response message length). Finally, the cyclic redundancy check CRC or additional data error detection and correction algorithms may be applied to bolster data reliability such as Huffman coding, Viterbi coding or other related schemes.

In one embodiment, a first type of data may be requested in a first poll and another type of data requested in another poll of the same terminal. In an alternative embodiment, two or more types of data may be requested from the same addressed group and responded to at the same time. Consequently, responses to polls and poll requests may have varying data packet lengths from embodiment to embodiment or within the same system embodiment at different times. Such is permitted via the "poll command code" field and the variable "response message length" fields which may signal the response of multiple types of data (or just one) in the same poll having signaled data response message lengths.

As described above, for store and forward polling in a LEO satellite polling embodiment according to FIG. 5B, there is most conveniently provided a further data field indicator of the time interval from the expected time of receipt at the LEO satellite of the polling request and the passage of the LEO satellite over the serving area of the group to be polled.

Also, a "time for return" field may be optionally used as an indicator for a group of receivers to time return response to avoid collisions so one subscriber response to a group poll does not collide at a LEO satellite with another subscriber response as will be discussed further herein.

Also in the polling request or with the polling request from the geostationary satellite, accurate time-of-day (not shown in FIG. 7A) may be transmitted according to U.S. Pat. No. 4,994,908 and corrected according to its location to an accuracy of 5 microseconds per mile of accuracy. In this manner, return data may be time-stamped and accurate real time of day determined for obtaining, for example, viewing statistics data.

Other data that may be provided over the geostationary satellite or other service providing path include daily or weekly programming guide information updates, new premium program offerings via a barker channel, and other system announcement services. These may be system wide broadcasts as will be further described herein.

Referring now to FIG. 7B, there is shown a typical data packet response to a polling request. The response packet must be of maximum predetermined length as allocated by the LEO satellite system characteristics and parameters, for example, two hundred bits or fifty bytes maximum length. The packet includes gateway identifier (gateway id) to identify the low earth orbit satellite gateway, a service provider identifier (SP ID) and a subscriber identifier (sub id). At least the gateway identifier and service provider identifier are preferably sent in the clear, that is, they are not encrypted and easily intelligible to the gateway for routing purposes. The subscriber identifier may be encrypted in some applications and transmitted in the clear in others. The rest of the data including the conditional access data (cond acc), viewing statistics data (view stat), other data, optional time of-day and data stamp (time code), the more-to-come flag and the CRC or other or additional data error detection and/or correction coding data are preferably encrypted, for example, by at least one key known to the service provider, such as via a unique secret serial number for the responding integrated receiver decoder or other terminal or a unique chip set identifier for a transmitter or transceiver according to FIGS. 8–10 or a combination of these identifiers. For example, referring briefly to FIGS. 5A or 5B, the SIS service provider may store a look-up table or secret serial numbers for terminals/transceivers associated with returned subscriber identifiers. In this manner, the returned data may be decrypted, for example, at the DBS accounting center and subsequently analyzed. Moreover, the data return may provide verification of terminal identities of legitimate service users. Uniquely encrypting data at a plurality of transmission sites for transmission to a reception site are described by U.S. Pat. No. 5,341,425, issued Aug. 23, 1994. As already indicated, the more-to-come-flag signals the accounting center whether there is more data to come from the responding integrated receiver decoder. If so, then, the unit is polled again at the earliest opportunity.

As already suggested, a further solution to the response gap problem shown in FIG. 6A is to decrease the predetermined message length for each subscriber or a group and intentionally cause a more-to-come flag. In this manner, group responses to polls, that is, the sum of all individual responses from included subscribers, will be of more even duration and more predictable. Practically the entire duration of the response period may be utilized for each poll response.

As already described, a further flag may be utilized, a memory 801 full flag or buffer full flag in the response packet. The buffer or memory full flag will signal the service provider to increase the frequency of polling of that responding subscriber terminal 2, 102 or to increase the buffer terminal memory size by reprogramming their terminal 2, 102.

Another optional data response field may comprise a position indicator (not shown). The position indicator provides an indication of latitude and longitude of a responding terminal 2a–2n or 102a–102n within one hundred meters of its true location on the Earth's surface. The position indicator may be requested in the event the system operator is concerned that a service pirate subscriber has intentionally moved the terminal and themselves to a new location to avoid payment. The anticipated position indicator is compared with a calculated position indicator as discussed above to determine, for example, if a subscriber has intentionally moved their terminal across a blackout region boundary in order to watch an otherwise prohibited sports or other entertainment attraction.

Other response packets may be utilized and particularly designed for terminal security. For example, a transceiver chip set identifier or terminal identifier stored in respective secure memories or both may be requested in a transaction aiming to identify pirates. If a response is not received or an incomplete response is received, the terminal can be denied service over the service providing path or the LEO path by an individually addressed data packet.

To define the data packets which follow, further fields may be included in a header (already including Gateway ID, SUB ID, SP ID and perhaps other data fields) or as the first fields of a data portion of a packet to define the data packets that follow (Packet Definition) and/or their combined or individual lengths (Packet Length). In this manner, in response to the same poll requesting multiple types of data, separate response packets or combined data packets may be generated differently identifying the included types of data. Consequently, response data packet length (and duration) may be varied from poll to poll for the same or different types of requested data and in keeping with the poll command code and response message length fields of FIG. 7A.

The formats shown in FIGS. 7A and 7B are representative of data packet arrangement in keeping with the present invention. Other fields may be devised in keeping with the present invention and these and the depicted fields arranged in different order and have varying lengths depending on the anticipated applications and requirements of the LEO or geostationary satellite system used.

Figure 8:
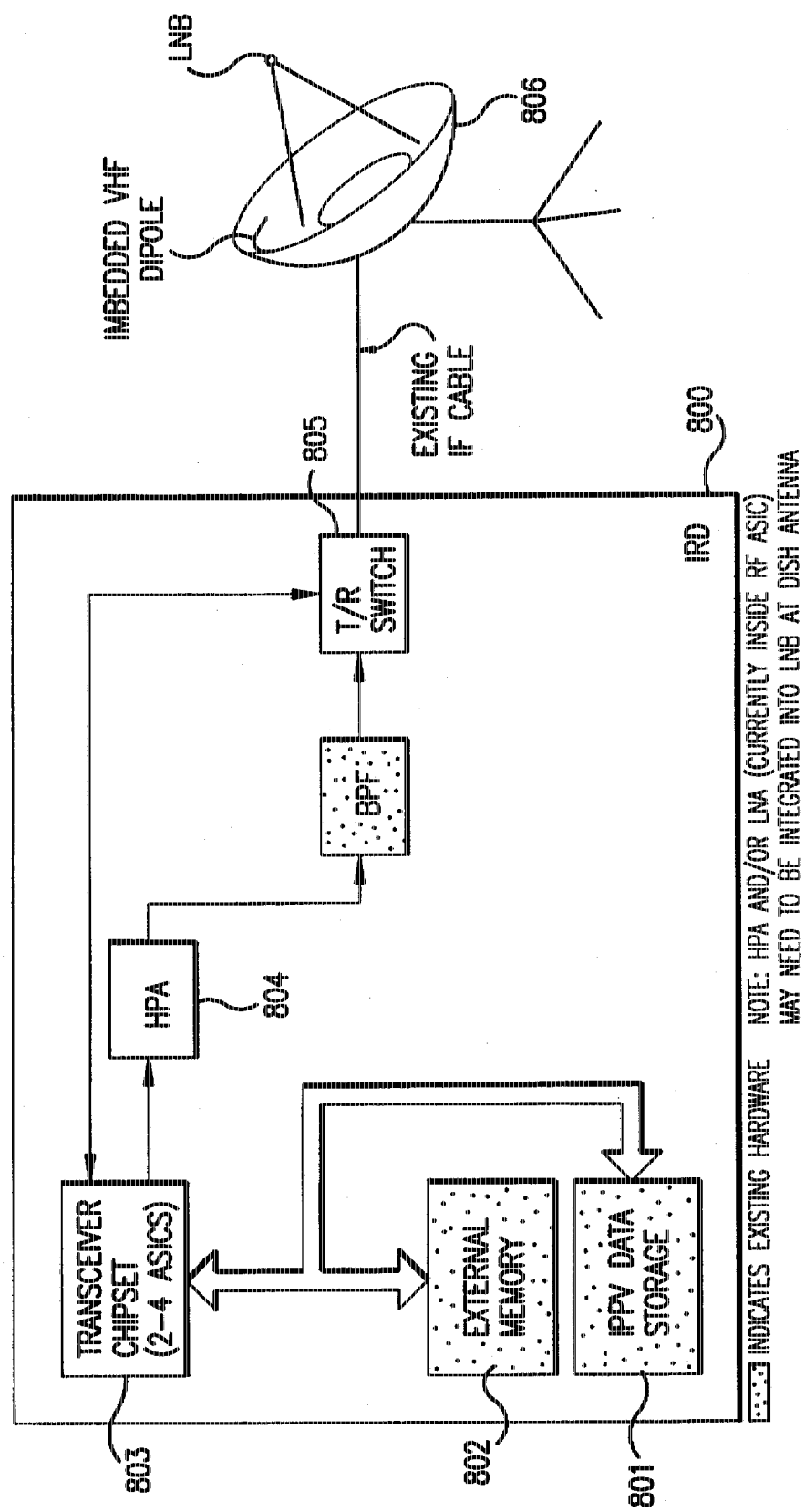
FIG. 8 provides a schematic functional block diagram of a typical integrated receiver decoder for DTH subscription information services modified according to the present invention to provide data memory, a poll/response transceiver (or response transmitter in a geostationary satellite polling system as per FIG. 5A), and a specially equipped antenna system for, at least, outputting LEO response signals toward the LEO satellite and receiving poll signals from the same or another path.

Now referring to FIG. 8, there is shown apparatus at a site of an integrated receiver decoder unit 800 or other terminal at a satellite subscriber location. The IRD or other terminal 800 interfaces with an impulse pay-per-view, pay-per-play or other conditional access data or other data memory 801 internal to the integrated receiver decoder or other terminal 800. The data memory 801 may further store viewing statistics data and other data. Typically, integrated receiver decoders or other terminals are programmable to provide new features and advantages in accordance with U.S. Pat. No. 5,367,571, issued Nov. 22, 1994 and pending U.S. patent application Ser. No. 08/072,291 filed Jun. 7, 1993, incorporated herein by reference. Thus, the internal memory 801 may be allocatable via instruction from the DBS accounting center of FIGS. 5A or 5B. Moreover, most integrated receiver decoders or other terminals are provided with an external data port. Consequently, even in the event an internal memory 801 is not provided, the terminal may be programmed to output its data for storage in external memory 802 or to utilize the external memory 802 as supplemental memory to memory 801. In other words, internal or external memory may be provided with an integrated receiver decoder or other terminal 800, all connected preferably via the typically provided external data port to a transceiver chip set 803.

According to the present invention and referring briefly to FIG. 5A, terminal 800 may receive programming guide data, synchronous timing data, "barker" channel data, home shopping data, game data and the like in addition to polling data over path 7,1,2 All of these data may be globally or group addressed. Blackout code data, time zone data, subscriber group preference data and the like may be group addressed over the path 7,1,2 as well. Moreover, individual subscriber preference program data, pay credit limits, subscriber keys, and other individual subscriber data may be transmitted via individually addressed data packets over path 7,1,2. Taken together with return path 2,3,4, a number of services and security features are provided by the present invention not here-to-fore possible in a DTH system.

One example is the updating of program scheduling and availability via viewing statistics data return. Another is locating and turning off pirate decoders. Another is locating subscriber terminals who would intentionally move their terminal out of a blackout zone. Another is to provide a requested game or applications software program to a user located from a service menu. Another is subscriber to subscriber E-mail or other messaging (where the response packet includes a destination subscriber address). Another is transmitting an order form for goods or services offered over a home-shopping channel. The applications of the present invention are only limited by the imagination.

The chip set 803 comprises, for example, at least an analog application specific integrated circuit (ASIC) for transmission and reception of data via the LEO satellite if required (for example, as already described, the embodiment of FIG. 5A requires no receiver) and a digital controller application specific integrated circuit. The transceiver chip set, as described above, may have a secret set identifier stored in secure memory of the transceiver or the terminal 800 (not shown) along with its secret serial number.

Preferably as many functions as possible will be shared between integrated receiver decoder or other terminal 800 and the plug-in or otherwise connected polling/response transceiver preferably comprising the ASIC chip set. For example, the clock and control circuitry for bit synchronization and carrier lock and recovery may be shared between IRD or other terminal 800 and the transceiver. Controller ASIC clock and oscillator clock and control outputs may be provided via terminal 800.

Assuming for the moment, that the IRD is utilized in a system according to FIG. 5B, then, the chip set 803 communicates via a high power amplifier (HPA) 804 through a bandpass filter and a transmit/receive switch 805 switched to appropriate position as required. Finally the T/R switch 805 connects with an antenna 806. The antenna 806 is connected via an existing intermediate frequency passing IF cable with the T/R switch 805 controlled by control leads (not shown) from a controller ASTC or microprocessor or related controller.

In order to accomplish transmission/reception of LEO signals, the antenna 806 is suitably equipped with an imbedded LEO frequency dipole (for example, very high frequency or VHF) operative at frequencies according to LEO prescribed transmission/reception frequency allocations below 1 GHz. The dipole also may be mounted at the location of a low noise block converter (LNB) for receiving and collecting DBS subscription information service signals from a satellite. The satellite dish then may provide some reflective gain to signals directable toward the LEO satellite, notwithstanding the satellite's movement across the sky, as the satellite dish prevents unintentional grounding and provides reflected direction toward the sky of signal power. Suitable filter diplexers (not shown) are utilized at each end of the existing cable link to the antenna to separate transmit and receive paths for the polling/response communications and the subscription information service signal.

Figure 9:
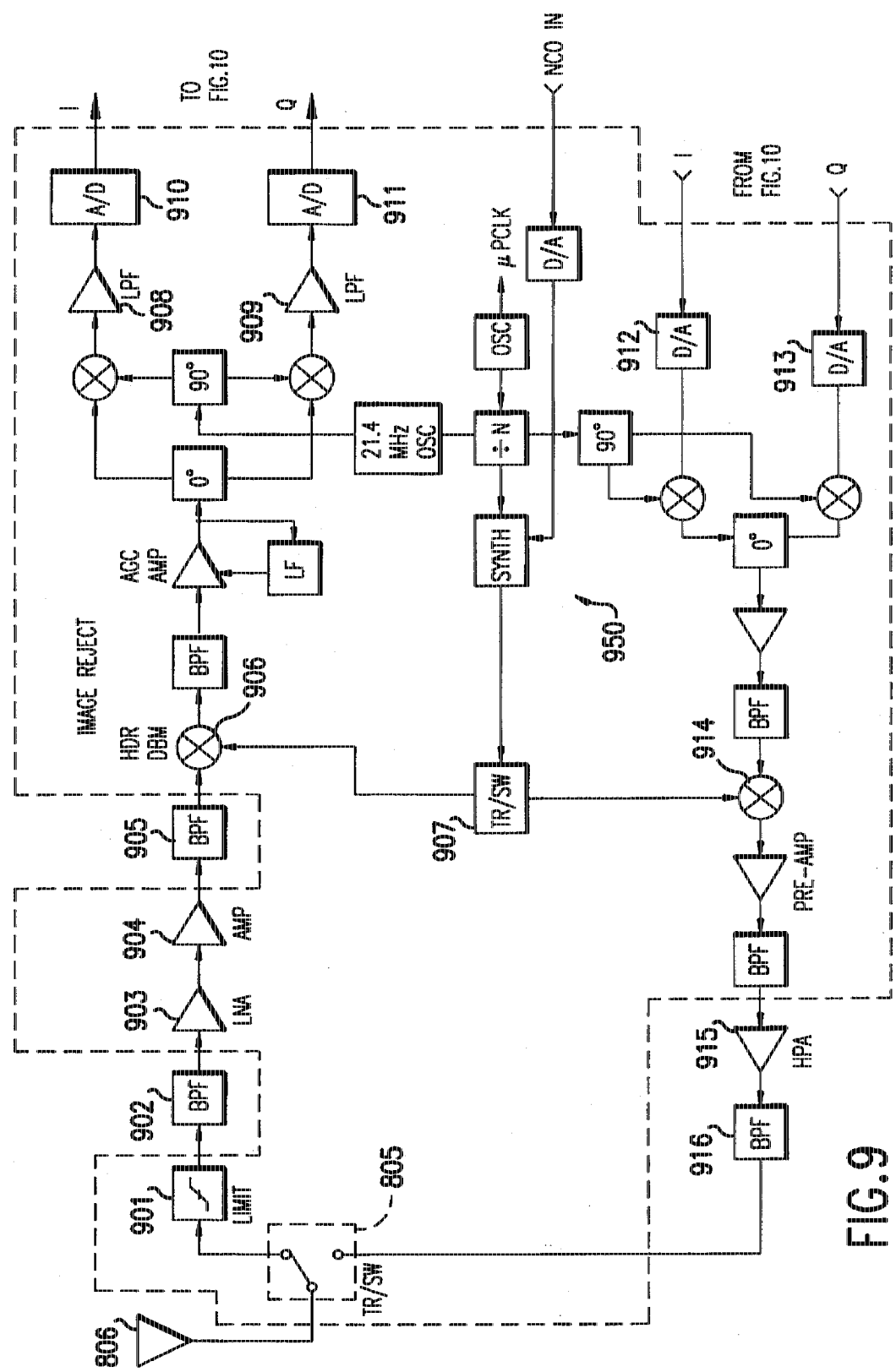
FIG. 9 provides a more detailed functional block diagram of a LEO transceiver analog circuit according to the present invention for use with a DTH integrated receiver decoder.

The transceiver analog ASIC is further described by FIG. 9 in which similar elements are identified similarly with FIG. 8. Antenna 806 is shown connected to T/R switch 805 to an upper receive path 901, 902, 903, . . . (not needed in the embodiment of FIG. 5A) and a lower transmit path 912, 913, 914, . . . The receive path may comprise a limiter clamper 901, a bandpass filter 902 for passing the LEO receive band, a lower noise amplifier LNA 903, a further signal amplifier 904 and bandpass filter 905 and a mixer or HDR DBM 906 under control of TR/SW oscillator output signals passed from switch 907. The oscillator frequency synthesizer section 950 generates an appropriate frequency depending on whether the transceiver is transmitting (lower section) or receiving for upconverting or downconverting respectively. The oscillator section preferably derives clocking and control information or at least an oscillator frequency correlation input on lead NCO from NCO of FIG. 10. Preferably many of the frequency generation and control functions may be obtained from integrated receiver decoder or other terminal 800.

In, for example, a quadrature amplitude modulated data system in which I and Q data streams are to be separated, there are also provided appropriate demodulation sections including low pass filters 908, 909 and analog to digital converters 910, 911 for providing at an output each of I and Q data streams at low LEO baud rate. The I and Q data streams are then provided to the digital section for further processing according to FIG. 10.

Figure 10:
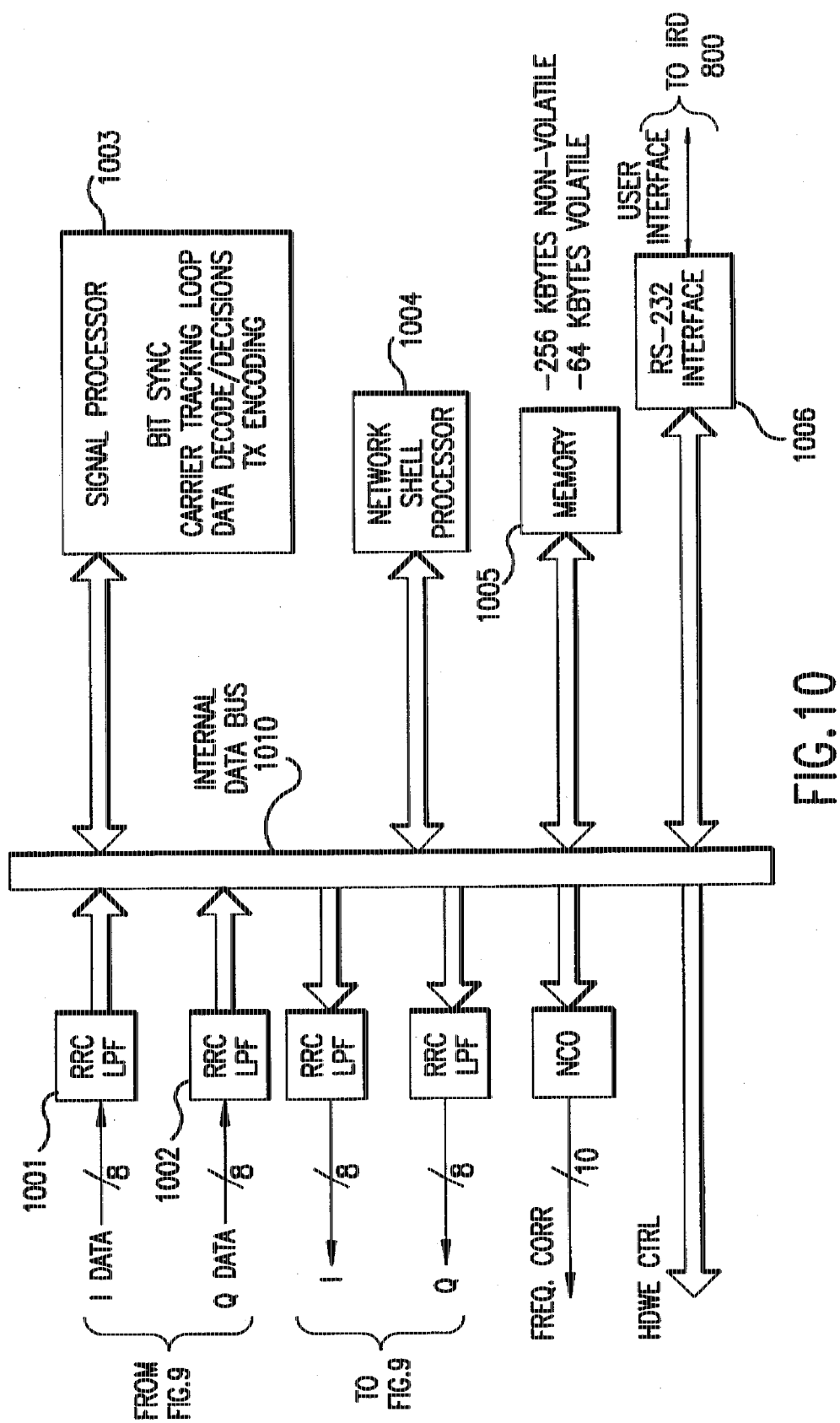
FIG. 10 provides a more detailed functional block diagram of a digital processor circuit for controlling the transceiver of FIG. 9 and appropriately interfacing with a DTH subscription information services integrated receiver decoder.

Now referring to the lower transmit section found either in the embodiment of FIGS. 5A or 5B, I and Q data streams are input from FIG. 10 to analog-to-digital converters 912, 913 after packet formation in digital section (FIG. 10) for modulation onto a generated carrier in well known manner. The output of the mixer 914 is provided via a high power amplifier 915 and band pass filter 916 through appropriately connected TR/SW switch 805 (shown in the receive position, rather than the transmit position) to antenna 806.

FIG. 10 represents a possible digital controller ASIC block diagram. The I and Q data streams (from FIG. 9) are shown filtered by respective low pass filters 1001, 1002 and provided to an internal data bus 1010. Internal data bus 1010 is the communications highway of the digital ASIC and also carries transmit I and Q data streams for delivery to analog circuit (FIG. 9), frequency correlation signal from NCO clock oscillator and hardware control such as transmit/ receive switch control as required. A signal processor 1003 provides bit synchronization, a carrier tracking loop control, data decoding decisions and transmit packet encoding functions as required. Further, a network shell processor 1004 may be provided for network routing decisions, data collection from and coordination with terminal 800 and packet formulation including time-of-day processing and stamping of transmit packets as appropriate. Network processor 1004 may be a secure processor and preserve encrypting serial numbers and output encrypted data packet portions to processor 1003 for further packetizing. Also shown is memory 1005 (which may be the same as external memory 802 of FIG. 8) for temporary storage of received LEO packets and storage of program code and temporary conditional access, viewing statistics and other data as appropriate. Finally, there is shown an exemplary RS-232 interface 1006 with the integrated receiver decoder or other terminal 800 of FIG. 8 modified as necessary for return path transmission.

FIGS. 9 and 10 assume a worst case situation in which no or few responsibilities may be shared between LEO transceiver and integrated receiver decoder or other terminal 800, 2a–2n. Practically speaking and depending on the construction of the integrated receiver decoder or other terminal and its external data port, many control and analog functions may be accomplished by the terminal 800 and not by an outboard or plug-in LEO transceiver. Moreover, as already suggested, and in accordance with the system embodiment of FIG. 5A, FIGS. 9 and 10 may be greatly simplified to simply provide data storage, data encryption, data packetization and data transmission via return path 2,3,4.

Thus, there has been shown and described a system and method for providing a data return path in a subscription information service delivery system having the advantages sought. Other modifications and deviations may be made to the embodiments herein described without deviating from the spirit of the present invention defined by the following claims.

What is claimed is:

1. Receiver apparatus for receiving a subscription information service signal at frequencies exceeding 1 Ghz via a first path and transmitting, responsive to a poll, a response signal by a subscriber, at frequencies under 1 Ghz via a second path directly to a low earth orbit satellite, the apparatus comprising:
    a memory for storing data entered by the subscriber, related to the subscription information service acceptance by said subscriber; and
    a transmitter responsive to a polling request for transmitting the stored data entered by the subscriber, and subscriber identification data modulated onto a signal at frequencies under 1 Ghz via the second path directly to the low earth orbit satellite.

2. The receiver apparatus of claim 1 wherein the transmitted data further includes a service provider identifier.

3. The receiver apparatus of claim 1 wherein the subscription information service acceptance data comprises one of conditional access data and viewing statistics data.

4. The receiver apparatus of claim 1 wherein the subscription information service acceptance data is encrypted.

5. The receiver apparatus of claim 1 wherein the transmitted data further includes a time-of-day field.

6. The receiver apparatus of claim 1 wherein the transmitted data further includes a more-to-come flag.

7. The receiver apparatus of claim 1 wherein the transmitted data further includes a memory full flag.

8. The receiver apparatus of claim 1 wherein the data transmission is responsive to a poll transmitted with the subscription information service signal.

9. The receiver apparatus of claim 1 wherein the data transmission is responsible to a poll received from the low earth orbit satellite.

10. The receiver apparatus of claim 9 wherein the poll transmission to the low earth satellite includes a data field representing the time interval until the low earth orbit satellite is visible to a group of receivers to be polled including the receiver apparatus.

11. The receiver apparatus of claim 1 wherein the poll comprises a group addressed communication including a poll command.

12. The receiver apparatus of claim 11 wherein the addressed communication further comprises a response message length definition field.

13. A method for polling a receiver of a subscription information service signal, the method comprising the steps of:
    polling a receiver of a subscription information service;
    forwarding a subscription information service signal at frequencies exceeding 1 Ghz via a first path;
    storing data entered by a subscriber, related to the subscription information service acceptance by said subscriber; and
    transmitting, responsive to the polling step, the stored data entered by the subscriber and subscriber identification data modulated onto a signal at frequencies under 1 Ghz via a second path directly to a low earth orbit satellite.

14. A polling method according to claim 13 further comprising the step of
    receiving the polling request along with the subscription information service signal.

15. A polling method according to claim 13 further comprising the step of
    receiving the polling request via the second path to the low earth orbit satellite.

16. A polling method according to claim 13 further comprising the step of
    transmitting a more-to-come flag along with the stored data.

17. A polling method according to claim 13 further comprising the step of
    transmitting a memory full flag along with the stored data.

18. A polling method according to claim 13 further comprising the step of
    transmitting a time-of-day field along with the stored data.

19. A polling method according to claim 13 further comprising the step of
    transmitting subscriber identification data along with the stored data.

20. A polling method according to claim 13 further comprising the step of encrypting the stored data prior to transmission.

21. A polling method according to claim 20 further comprising the step of encrypting the stored data according to a key known to a service provider from subscriber identification data transmitted with the response to the polling request.

22. A method according to claim 21 wherein the data related to the information services comprises program selection data and the service delivery step includes delivery of a selected program.

23. A method according to claim 21 wherein the data related to the information services comprises conditional access data and the service delivery step includes modification of terminal credit memory.

24. A method according to claim 21 wherein the data related to the information service comprises terminal location data and the service delivery step includes deactuation of the terminal when the terminal has been relocated.

25. A method according to claim 21 wherein the data related to the information service is polled at a time when first and second low earth orbit satellites are visible to the terminal and further comprises the step of determining the location of the polled terminal.

26. A method according to claim 21 wherein the data related to the information service is polled on first and second passes of a low earth orbit satellite over a terminal and the location of the passing low earth orbit satellite has changed relative to the terminal at the time of the poll and further comprises the step of determining the location of the polled terminal.

27. The method of offering information services to a subscriber and delivering or refusing services to the subscriber or to a service pirate of a subscription information service delivery system comprising the steps of:

offering information services to a subscriber;

initiating a poll request signal;

generating data related to the information services at a terminal;

storing said data at the terminal;

directly transmitting to a low earth orbit satellite, a poll response signal at frequencies under 1 Ghz via a first path wherein the poll response signal comprises the stored data and a subscriber identifier;

receiving the poll response signal;

processing the data at a control center; and delivering services or refusing services over a second path at frequencies exceeding 1 Ghz to the subscriber responsive to the data processing.

28. A method for receiving and responding to a polling request, wherein said polling request is integrated with a subscription information signal, the method comprising the steps of:

receiving a subscription information service signal and a polling request from a geostationary satellite at frequencies exceeding 1 Ghz via a first path;

storing data related to the subscription information service acceptance by a subscriber; and transmitting, responsive to the polling request, the stored data and subscriber identification data modulated onto a signal at frequencies under 1 Ghz via a second path to a low earth orbit satellite.

29. The method for receiving according to claim 28 where said stored data is at least one of the group comprising: conditional access data, viewing statistics data, home shopping data, subscriber messaging or service request data.

30. The method for receiving according to claim 28 further comprising the step of transmitting a more-to-come flag along with the stored data.

31. The method for receiving according to claim 28 further comprising the step of transmitting a memory full flag along with the stored data.

32. The method for receiving according to claim 28 further comprising the step of transmitting a time-of-day field along with the stored data.

33. The method for receiving according to claim 28 further comprising the step of transmitting subscriber identification data along with the stored data.

34. The method for receiving according to claim 28 further comprising the step of encrypting the stored data prior to transmission.

35. The method for receiving according to claim 34 further comprising the step encrypting the stored data according to a key known to a service provider from subscription identification data transmitted with the response to the polling request.

36. A method for receiving a polling request and a subscription information signal, and responding to said polling request, the method comprising the steps of:

receiving a polling request from a first satellite;

receiving a subscription information service signal at frequencies exceeding 1 Ghz via a second satellite;

storing data related to the subscription information service acceptance by a subscriber; and transmitting, responsive to the polling request, the stored data and subscriber identification data modulated onto a signal at frequencies under 1 Ghz via first satellite.

37. The method for receiving according to claim 36 where said stored data is at least one of the group comprising: conditional access data, viewing statistics data, home shopping data, subscriber messaging or service request data.

38. The method for receiving according to claim 36 further comprising the step of transmitting a more-to-come flag along with the stored data.

39. The method for receiving according to claim 36 further comprising the step of transmitting a memory full flag along with the stored data.

40. The method for receiving according to claim 36 further comprising the step of transmitting a time-of-day field along with the stored data.

41. The method for receiving according to claim 36 further comprising the step of transmitting subscriber identification data along with the stored data.

42. The method for receiving according to claim 36 further comprising the step of encrypting the stored data prior to transmission.

43. The method for receiving according to claim 42 further comprising the step of encrypting the stored data according to a key known to a service provider from subscription identification data transmitted with the response to the polling request.

* * * * *